United States Patent [19]

Shimizu et al.

[11] Patent Number: 5,778,008
[45] Date of Patent: Jul. 7, 1998

[54] FAULT DIAGNOSIS METHOD OF TELEVISION CAMERA APPARATUS

[75] Inventors: Toshimichi Shimizu, Kokubunji; Kazuhiro Tanabe, Iruma, both of Japan

[73] Assignee: Hitachi Denshi Kabushiki Kaisha, Tokyo, Japan

[21] Appl. No.: 646,015

[22] Filed: May 7, 1996

[30] Foreign Application Priority Data

May 10, 1995 [JP] Japan ................. 7-111873
Jun. 19, 1995 [JP] Japan ................. 7-151286

[51] Int. Cl.⁶ .................................................. G06F 11/00
[52] U.S. Cl. .................................................. 371/25.1
[58] Field of Search ........................... 371/25.1, 24, 26, 371/27, 28, 20.5; 358/139

[56] References Cited

U.S. PATENT DOCUMENTS 4,810,958 3/1989 Mogi et al. ............... 324/73 R
5,173,899 12/1992 Ballance .................... 370/108
5,274,446 12/1993 Ashida ........................ 358/139

*Primary Examiner*—Vincent P. Canney
*Attorney, Agent, or Firm*—Antonelli, Terry, Stout & Kraus, LLP

[57] ABSTRACT

A fault diagnosis method of a television camera apparatus. A fault diagnosis of a television camera apparatus is divided into a plurality of diagnosing processes, and when the result of the fault diagnosis in each fault diagnosing process is diagnosed as abnormal, the fault diagnosis of the next fault diagnosing process is not executed. A microprocessor is provided in each of a camera head and a camera control unit, and each microprocessor independently executes the fault diagnosis and transmits the result of the fault diagnosis to the other. The camera head and the camera control unit constituting the television camera apparatus are connected with each other by a transmission line, and a test signal for diagnosis generated and transmitted by the camera head is received by the camera control unit so that the test signal for diagnosis so received is compared with an expected value corresponding to this test signal so as to execute the fault diagnosis. In the television camera apparatus having such a construction, a plurality of kinds of test signals for diagnosis are prepared in advance, and when these test signals are transmitted, information associated with each test signal is transmitted in combination. Comparison is then made between each test signal for diagnosis so received and the expected value corresponding to this test signal, and various fault diagnoses of the television camera apparatus are executed.

16 Claims, 10 Drawing Sheets

START BIT (1 BIT)   DATA (8 BITS)   PARITY (1 BIT)   STOP BIT (1 BIT)

FAULT DIAGNOSIS METHOD OF TELEVISION CAMERA APPARATUS

BACKGROUND OF THE INVENTION

1. Field of the Invention

This invention relates to an improvement in a fault diagnosis method of a television camera apparatus.

2. Description of the Related Art

In television camera apparatuses, fault diagnosis is generally executed by detecting a trouble or abnormality of the apparatuses by using a microcomputer (hereinafter abbreviated as the "CPU") and reporting the result of the fault diagnosis to a user.

According to the methods of diagnosing the faults of the prior art, troubles or abnormality of a power supply voltage, an abnormal function of each unit (circuit board), fall-off of each unit, wrong loading of each unit, abnormal operation of a system (cable disconnection, cable short-circuit, abnormal data communication between a camera head and a camera control unit, etc.), etc, are detected on the real time basis and abnormal items are displayed by characters in a view finder or on a monitor so as to report the fault to the user.

As to an image signal system, a test signal generation circuit and a circuit for switching an image signal from an imaging device and the test signal, are disposed in the camera head. When the fault diagnosis is executed, the switching circuit switches the signal to the test signal and the fault diagnosis is executed by detecting the amplitude of the test signal at a final output stage of the image signal.

Amplitude detection circuits for the test signals are disposed at a plurality of positions before the final image output stage so as to identify the position of the trouble, as described in JP-B-4-52038. A saw-tooth wave signal is used in most cases as the test signal.

The fault diagnosis of the television camera apparatuses hitherto diagnoses whether or not an image processing circuit is normal, by inputting a test signal for diagnosis to the image processing circuit, taking out the test signal for diagnosis that is processed by the image processing circuit, as an output signal, and comparing this output signal with a predetermined expected value (a reference value corresponding to the test signal).

Figure 9:
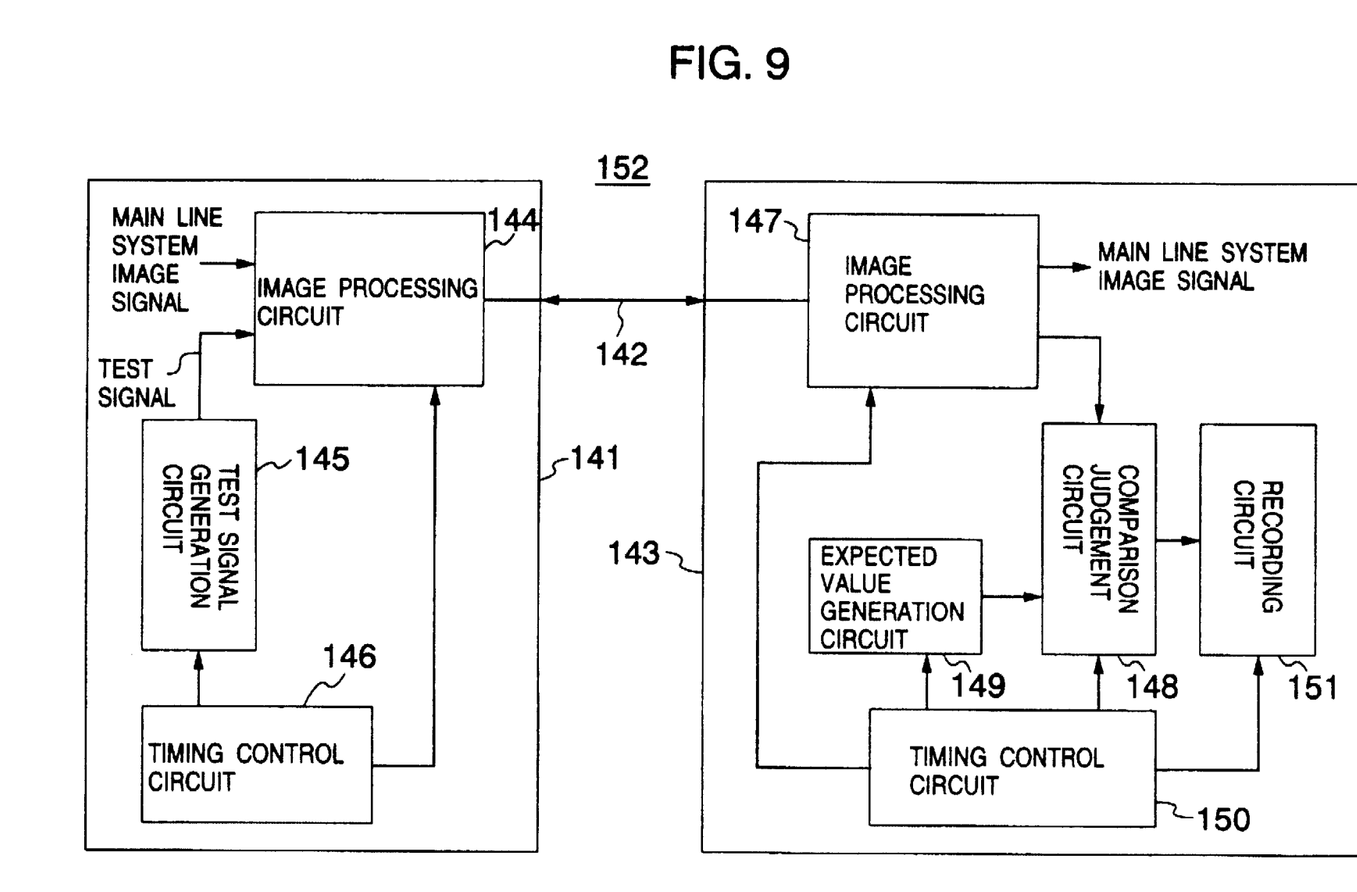
FIG. 9 is a block diagram showing a television camera apparatus equipped with a prior art fault diagnosing device.

FIG. 9 of the accompanying drawings is a schematic block diagram of a television camera apparatus including a prior art diagnosing device.

The television camera apparatus including the diagnosing device in FIG. 9 is constituted in such a manner that a test signal for diagnosis is transmitted from an image processing circuit provided in a camera head to an image processing circuit provided in a color control unit (CCU) through a transmission line, so as to execute fault diagnosis of the circuit portion from the image processing circuit of the camera head to the image processing circuit of the CCU.

In FIG. 9, reference numeral 141 denotes the camera head, reference numeral 143 denotes the CCU, reference numeral 142 denotes the transmission line connecting the camera head 141 to the CCU 143, reference numeral 152 denotes a television camera apparatus comprising the camera head 141, the CCU 143 and the transmission line 142, reference numeral 144 denotes the image processing circuit of the camera head 141, reference numeral 145 denotes a test signal generation circuit provided in the camera head 141, reference numeral 146 denotes a timing control circuit for generating a timing signal which controls the signal in the camera head 141 and the timing of the processing, reference numeral 147 denotes the image processing circuit of the CCU 143, reference numeral 148 denotes a comparison judgement circuit for comparing two input signals of the CCU 143 and outputting the judgement result, reference numeral 149 denotes an expected value generation circuit 150 provided in the CCU 143 so as to generate an expected value for diagnosis (a reference value corresponding to the test signal transmitted), reference numeral 150 denotes a timing control circuit for generating a timing signal which controls the signal in the CCU 143 and the timing of the processings, and reference numeral 151 denotes a recording circuit for recording the result of the diagnosis, etc.

Hereinafter, the diagnostic operation in the television camera apparatus including the prior art diagnosing device will be explained.

The operations such as ordinary image processing, image transmission, etc, are carried out in each of the camera head 141 and the CCU 143. An image signal of a main line system is inputted to the image processing circuit 144, is processed in a predetermined way, and is transmitted and inputted to the image processing circuit 147 through the transmission line 142. After subjected to predetermined processing in this image processing circuit 147, the image signal is outputted as the main line system image signal to other apparatuses.

To conduct the fault diagnosis, the test signal for diagnosis, which is controlled by the timing signal from the timing control circuit 146, is first generated by the test signal generation circuit 145 in the camera head 141 and is outputted to the image processing circuit 144.

The test signal for diagnosis which is inputted to the image processing circuit 144 separately from the main line system image signal is controlled and processed on the basis of the timing signal from the timing control circuit 146 separately inputted to the image processing circuit 144, and is inserted to a predetermined position of the main line system image signal during a vertical blanking period.

The test signal for diagnosis inserted into the main line system image signal is processed in a predetermined way with the main line system image signal by the image processing circuit 144, and is outputted to the CCU 143 from the image processing circuit through the transmission line 142.

The main line system image signal into which the test signal for diagnosis is inserted and which is transmitted through the transmission line 142 is inputted to the image processing circuit 147, is processed in a predetermined way in this circuit 147 and is outputted as the main line system image signal (under the state where the test signal for diagnosis is inserted or under the state where it is removed) to other apparatus. This main line system image signal is separately outputted (under the state of the main line system image signal where the test signal for diagnosis is inserted or under the state where only the test signal for diagnosis exists) to the comparison judgement circuit 148.

The expected value corresponding to the test signal and generated by the expected value generation circuit 149, which is controlled by the timing signal from the timing control circuit 150, is separately inputted to the comparison judgement circuit 148 with the main line system image signal into which the test signal for diagnosis is inserted.

The comparison judgement circuit 148 judges and compares the test signal for diagnosis, which is inputted to, and is processed by, the image processing circuits 144 and 147 and is outputted from them, and the expected value corresponding to the test signal for diagnosis and outputted from the expected value generation circuit 149 when this test signal is outputted, and outputs the judgement result to the recording circuit 151.

The recording circuit 151 records the judgement result from the comparison judgement circuit 148 and other data.

Incidentally, the timing control circuit 146 inside the camera head 141 and the timing control circuit 150 inside the CCU 143 are synchronously controlled.

SUMMARY OF THE INVENTION

According to the prior art technology described above, the fault diagnosis is executed simultaneously for all the items for fault diagnosis. Therefore, when the number of items which are diagnosed as abnormal is great as the result of the fault diagnosis, the casual sequence of each abnormality cannot be identified, and an extended period of time is necessary for the analysis of the cause of faults.

In the television camera apparatus equipped with the prior art diagnosing device, not only the diagnosis of one characteristic feature but also the diagnoses of difference characteristic features are executed in some cases, and a plurality of kinds of test signals for these diagnoses must be generated and must be switched by the test signal generation circuit inside the camera head. In this case, it is easy to generate and switch a plurality of kinds of test signals for diagnoses by the test signal generation circuit inside the camera head, but it is not so easy to generate synchronously the expected values corresponding to a plurality of kinds of test signals for diagnoses by the expected value generation circuit inside the CCU connected by the transmission line.

Though phase synchronization is established between the camera head and the CCU for the horizontal and vertical periods, only one kind of test signal for diagnosis can be inserted during one vertical blanking signal period in consideration of the data quantity.

In order to execute the diagnosis by switching N kinds of test signals for diagnosis, therefore, a phase sync circuit must be constituted in a cycle which is at least N times the cycle of the vertical blanking signal. In consequence, the circuit scale becomes unavoidably great, and adverse influences are exerted on stability of synchronization, too.

To avoid such a problem, the prior art apparatuses use a fixed test signal for diagnosis and for this reason, it is not easy to improve efficiency of the diagnosis.

It is an object of the present invention to provide a fault diagnosis method of a television camera apparatus which can eliminate these problems of the prior art and can quickly analyze the causes of the fault when any fault occurs.

It is another object of the present invention to provide a fault diagnosis method of a television camera apparatus which rationally interlocks switching of a plurality of kinds of test signals for diagnoses with switching of expected values corresponding to the test signals, accomplishes the fault diagnoses by a plurality of kinds of test signals for diagnoses and improves efficiency of the diagnosis.

According to one aspect of the present invention, the first-mentioned object described above can be accomplished by dividing fault diagnosis of a television camera apparatus into a plurality of diagnosing processes so that, when the result of the fault diagnosis of one fault diagnosing process proves abnormal, the fault diagnosis of a next diagnosing process is not executed, and by mounting a CPU to each of a camera head and a camera control unit so as to constitute a fault diagnosis system wherein each CPU can independently execute the fault diagnosis and can transmit the result of the fault diagnosis to the other.

As a result, when the result of the fault diagnosis proves abnormal, the user of the apparatus can sequentially trace the content of abnormality from the fundamental fault, and can therefore analyze quickly the cause of the fault of the apparatus.

According to another aspect of the present invention, the last-mentioned object of the invention described above can be accomplished by a fault diagnosis method of a television camera apparatus which apparatus includes a camera head and a CCU connected with each other by a transmission line, and wherein the camera head generates and transmits a test signal for diagnosis and the CCU receives the test signal, compares it with an expected value corresponding to the test signal and executes the fault diagnosis, the method comprising the steps of preparing a plurality of kinds of test signals for diagnosis, transmitting identification information for identifying a plurality of kinds of test signals for diagnosis or the expected values corresponding to the test signals with the test signal when the test signals are transmitted, comparing each test signal for diagnosis so received with each expected value corresponding to the test signal by utilizing the identification information or the corresponding expected value so received, and executing the fault diagnosis of the television camera apparatus.

Preferably, when any diagnostic error is detected, the CPU for diagnosing and analyzing the fault, disposed in each of the camera head and the CCU, selects the test signal for diagnosis that is necessary for identifying the cause of the diagnostic error, and transmits a test request based on the selected test signal for diagnosis to the camera head or the CCU, and the camera head or the CCU thereafter analyzes the diagnostic error by the test signal for diagnosis that corresponds to the identification of the cause of the diagnostic error, upon receiving the test request.

Because the identification information for identifying each test signal for diagnosis or the expected value corresponding to each test signal for diagnosis is transmitted with each test signal for diagnosis when a plurality of kinds of test signals for diagnosis are transmitted so as to execute a plurality of kinds of fault diagnoses, the corresponding expected value can be generated in synchronism with each test signal for diagnosis so received, by utilizing the received identification information or expected value. In this way, various fault diagnoses of the television camera apparatuses can be executed.

When any diagnostic error is detected, the CPU for diagnosing and analyzing the fault, disposed in each of the camera head and the CCU, can select the test signal for diagnosis that is necessary for identifying the cause of this diagnostic error, and transmits the test request for the fault diagnosis based on this test signal for diagnosis to the other CPU. The other CPU thereafter analyzes the diagnostic error by the test signal for diagnosis that corresponds to the identification of the diagnostic error. Accordingly, the cause of the diagnostic error can be analyzed automatically.

DESCRIPTION OF THE PREFERRED EMBODIMENTS

Some preferred embodiments of the present invention will be explained hereinafter with reference to the accompanying drawings.

Figure 1:
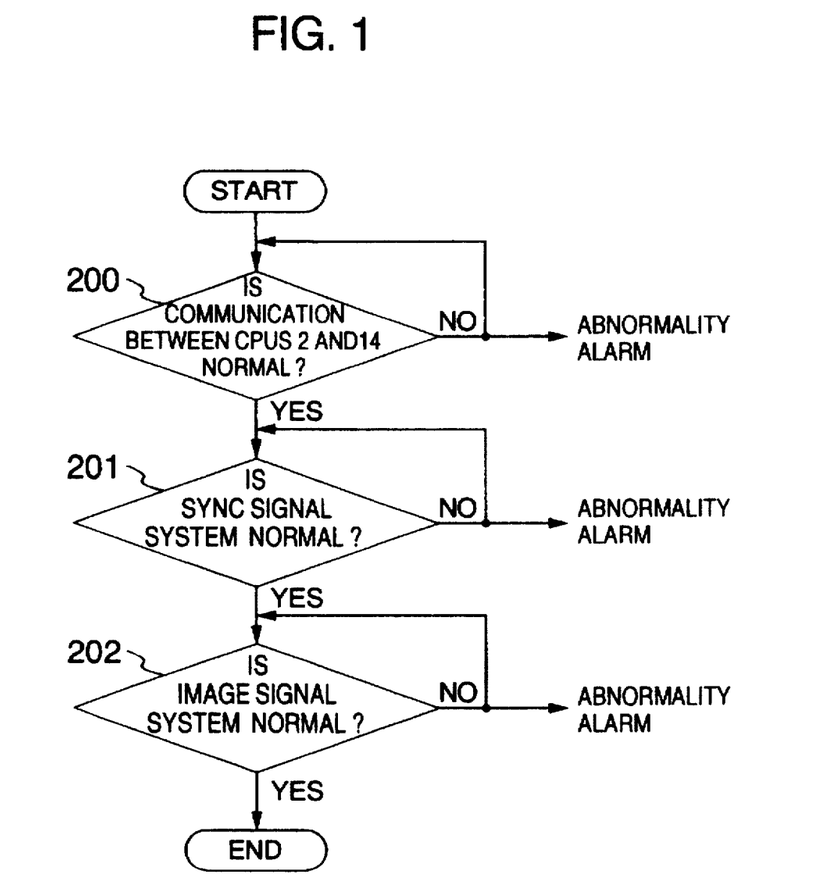
FIG. 1 is a flowchart showing the fault diagnosing process according to one embodiment of the present invention.
Figure 2:
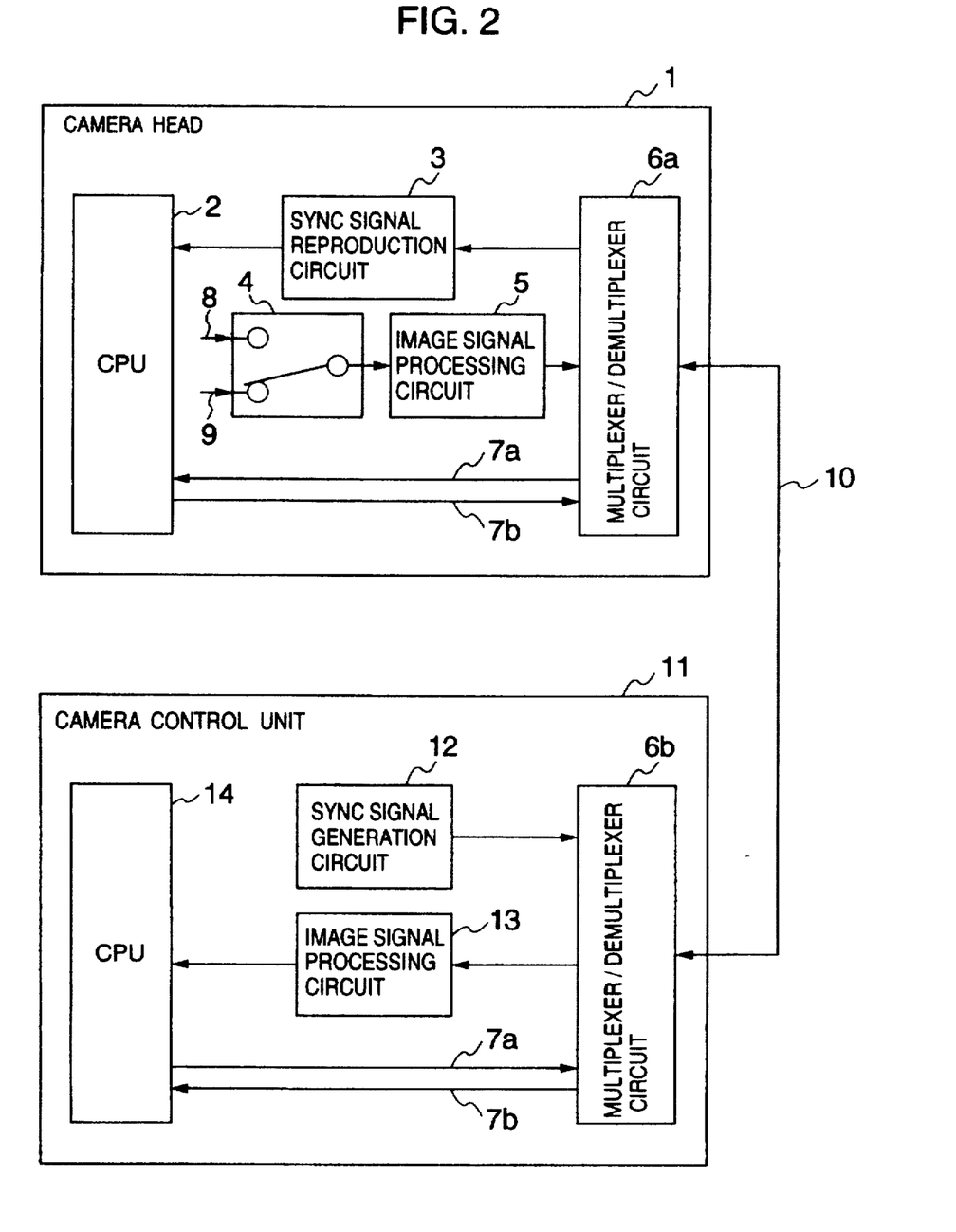
FIG. 2 is a block diagram showing the overall construction of a television camera apparatus applied to the fault diagnosis method according to the present invention.

FIG. 2 is a block diagram of a fault diagnosing system of a television camera apparatus according to the present invention which system uses digital signal transmission for the signal transmission between a camera head 1 as a sub-apparatus constituting the television camera apparatus and a camera control unit 11 as another sub-apparatus, and FIG. 1 is a flowchart of the operation of the television camera apparatus.

When fault diagnosis of the television camera apparatus is carried out in the present invention, it is divided into a plurality of fault diagnosing processes or steps, and fault diagnosis is sequentially conducted from the fundamental fault diagnosing system.

Therefore, whether or not the data communication system between a CPU 2 inside the camera head 1 and a CPU 14 inside the camera control unit 11 is normal is judged as the first fault diagnosing process (step 200).

More specifically, whether or not the data communication system between the CPU 2 inside the camera head 1 and the CPU 14 inside the camera control unit 11 is normal must be checked first. Otherwise, if the result of fault diagnosis of the image signal system proves abnormal, for example, whether this diagnostic result originates from abnormality of the image signal system or from abnormality of the data communication system or other systems for diagnosis cannot be identified. Further, when the data communication system is abnormal, the diagnostic result of diagnosis effected by each of the CPUs 2 and 14 cannot be transmitted correctly to the other CPU.

Therefore, diagnosis of the data communication system is first carried out as the first process of fault diagnosis in order to confirm whether or not the diagnostic result of fault diagnosis to be subsequently made can be correctly transmitted to the other CPU.

Therefore, the CPU 2 of the camera head 1 monitors the communication data 7a transmitted from the camera control unit 11 to the camera head 1 through a transmission line 10 while the CPU 14 of the camera control unit 11 monitors the communication data 7b transmitted from the camera head 1 to the camera control unit 11.

Figure 3:
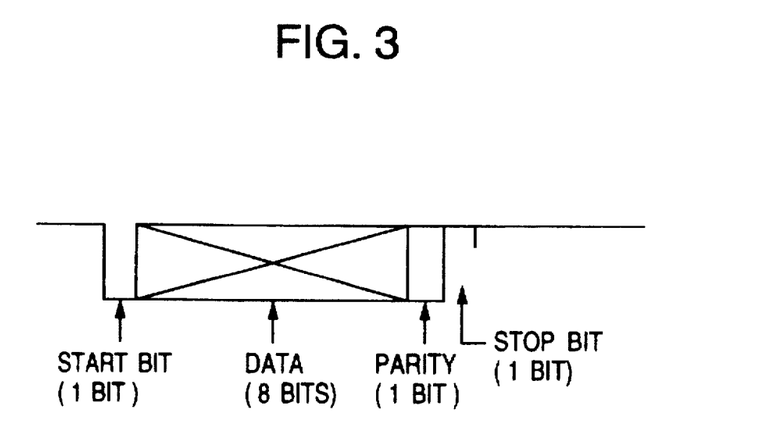
FIG. 3 is a diagram showing the construction of communication data in the present invention.
Figure 4:
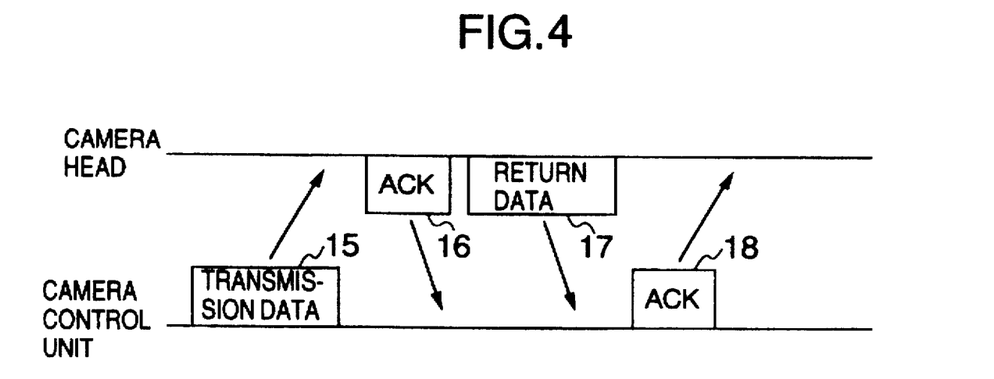
FIG. 4 is a conceptual view of data communication procedures in the present invention.

FIG. 3 shows the construction of these communication data 7a and 7b and FIG. 4 shows the data communication procedure between the camera head 1 and the camera control unit 11.

Transmission data 15 for fault diagnosis is transmitted as the communication data 7a from the CPU 14 of the camera control unit 11 to the camera head 1.

The CPU 2 of the camera head 1 receives the communication data 15, effects parity check of the data so received and transmits ACK data 16 representing that reception is successful if the result is normal, as well as return data 17 for fault diagnosis as the communication data 7b, to the camera control unit 11.

When the result of parity check proves abnormal, the CPU 2 of the camera head 1 transmits data other than the ACK data, such as NACK data, to the camera control unit 11 in order to represent that it fails in reception, and does not transmit the return data 17. Receiving the ACK data 16, the CPU 14 of the-camera control unit 11 then receives the return data 17, effects parity check of the data so received, and returns the ACK data 18 representing that reception is successful, to the camera head 1.

When the result of parity check described above proves abnormal, the CPU 14 of the camera control unit 11 transmits data other than the ACK data, such as the NACK data, in order to represent that it fails in reception.

When the CPU 14 of the camera control unit 11 cannot receive the ACK data 16, or when the result of parity check of the return data 17 proves abnormal, the CPU 14 judges that abnormality exists in the communication data 7a or 7b.

Similarly, when the CPU 2 in the camera head 1 detects an abnormality in the result of parity checking of the communication data 15 or when the CPU 2 fails to receive the ACK data 18, the CPU 2 judges that abnormality exists in the communication data 7a or 7b.

When these communication data 7a and 7b are judged as abnormal, subsequent fault diagnosis is not effected, and the user of the apparatus is notified of the fact that the data communication system between the CPUs 2 and 14 is abnormal. Therefore, the user of the apparatus can concentrate his or her efforts on the analysis of the cause of fault of the communication data 7a and 7b.

When the data communication system between the CPU 2 of the camera head 1 and the CPU 14 of the camera control unit 11 is judged as normal, fault diagnosis of the data communication system is completed, and fault diagnosis of the sync signal system is then carried out as the second step of fault diagnosis (step 201).

In the television camera apparatus using digital signal transmission, the sync signal for synchronizing the image signal systems of the camera head 1 and the camera control unit 11 is transmitted as a reference signal from the camera control unit 11 to the camera head 1. Since the camera head 1 transmits the image signal of the camera head 1 to the camera control unit 11 by using this sync signal as the reference, the image signal of the camera head 1 cannot be correctly transmitted to the camera control unit 11 if any abnormality exists in the sync signal system. Therefore, fault diagnosis of the sync signal system is carried out as the second step of fault diagnosis.

The sync signal generated by a sync signal generation circuit 12 of the camera control unit 11 is multiplexed with other signals by a digital multiplexer/ demultiplexer circuit 6b and is transmitted to the camera head 1. The digital multiplexer/demultiplexer circuit 6a of the camera head 1 demultiplexes the sync signal transmitted thereto, and the sync signal is reproduced by the sync signal reproduction circuit 3.

Incidentally, the multiplexer/demultiplexer circuit 6a and the later-appearing multiplexer/demultiplexer circuit 6b may be implemented by the technology described in U.S. patent application Ser. No. 08/361,724 entitled "METHOD FOR BIDIRECTIONALLY TRANSMITTING DIGITAL VIDEO SIGNAL AND VIDEO SIGNAL BIDIRECTIONALLY TRANSMITTING SYSTEM" and filed on Dec. 23, 1994. The disclosure of this U.S. Ser. No. 08/361,724 is hereby incorporated by reference.

Figure 5:
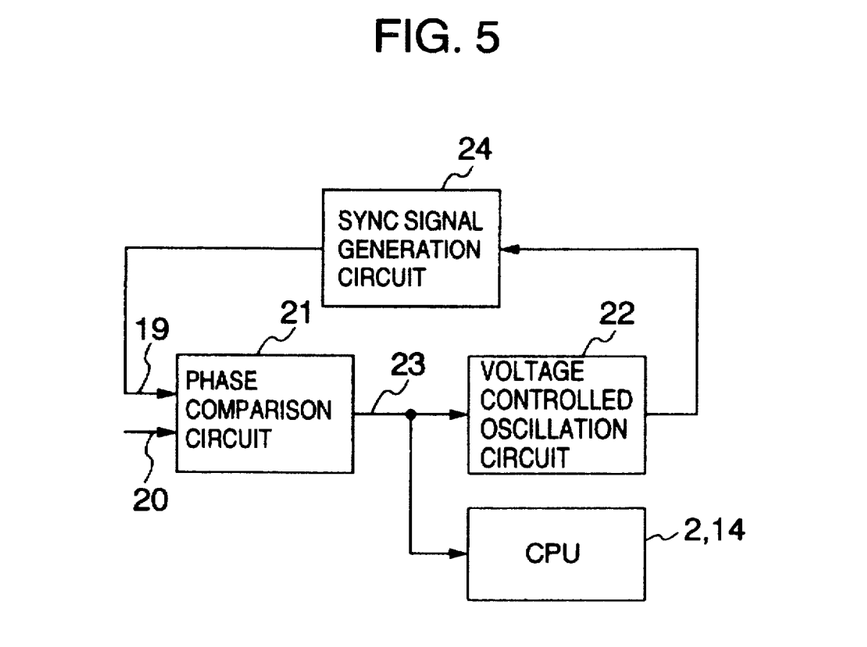
FIG. 5 is a block diagram showing the internal construction of a sync signal reproduction circuit of a camera head according to the present invention.

FIG. 5 is a block diagram showing the internal construction of the sync signal reproduction circuit 3 of the camera head 1. The sync signal 20 demultiplexed by the multiplexer/demultiplexer circuit 6a and the sync signal 19 generated by the sync signal generation circuit 24 inside the sync signal reproduction circuit 3 are inputted to a phase comparison circuit 21 and their phases are compared. The result of phase comparison is inputted as a phase error voltage 23 to a voltage controlled oscillation circuit 22. The oscillation frequency of the output of the voltage controlled oscillation circuit 22 is controlled in accordance with the magnitude of the inputted phase error voltage 23, and this output is inputted to the sync signal generation circuit 24.

The sync signal generation circuit 24 conducts its control so that the phase of the sync signal 19 coincides with the phase of the sync signal 20 on the basis of the oscillation frequency inputted thereto.

The operation described above is repeated until the phase of the sync signal 20 demultiplexed becomes equal to the phase of the sync signal 19 of the camera head 1, that is, until the phase error voltage 23 of the output of the phase comparison circuit 21 becomes a constant value.

If the sync signal 20 transmitted from the camera control unit 11 is not correctly reproduced, the phase error voltage 23 gets into saturation.

For this reason, the CPU 2 of the camera head 1 detects the phase error voltage 23, judges that the sync system is normal if this detection voltage falls within a predetermined voltage range, and judges that the sync signal system is abnormal if the detection voltage is in saturation.

The CPU 2 of the camera head 1 judges whether or not the sync signal is correctly reproduced and at the same time, transmits the result of this fault diagnosis to the CPU 14 of the camera control unit 11. Here, when the result of fault diagnosis of the sync signal system proves abnormal, this abnormality of the sync signal system is reported to the user so as to take necessary measures without executing the subsequent fault diagnoses.

When the sync signal system is normal, fault diagnosis of the sync signal system is completed, and fault diagnosis of the image signal system is then carried out as the third step of fault diagnosis (step 202).

A switch circuit 4 of the camera head 1 switches the image signal 8 to a test signal 9 such as a saw-tooth signal at the time of fault diagnosis of the image signal system. The test signal 9 is multiplexed with other signals by the digital multiplexer/demultiplexer circuit 6a through the image signal processing circuit 5 of the camera head 1 and is transmitted to the camera control unit 11.

The digital multiplexer/demultiplexer circuit 6b of the camera control unit 11 demultiplexes the test signal transmitted thereto and outputs it to the image signal processing circuit 13.

Figure 6:
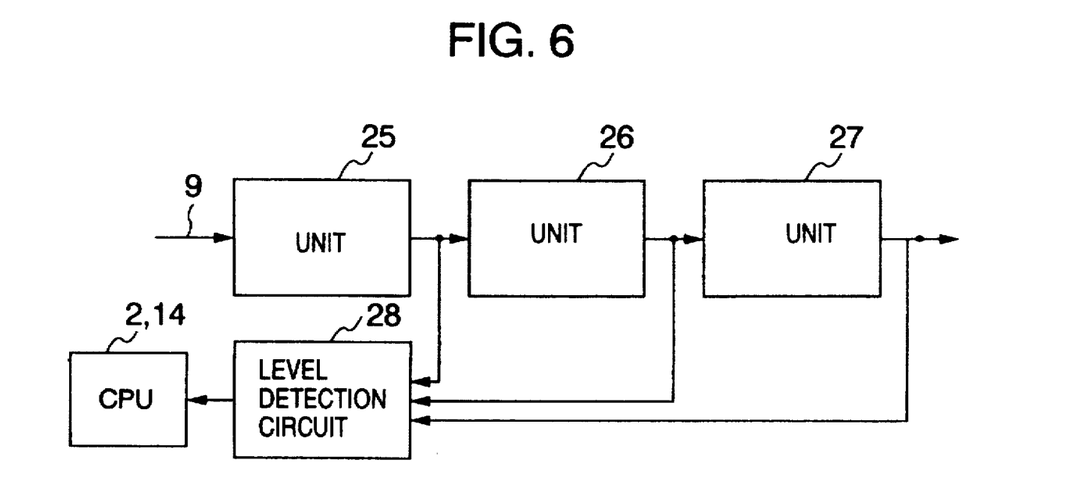
FIG. 6 is a block diagram showing the fault diagnosing construction of an image signal processing circuit according to the present invention.
Figure 7:
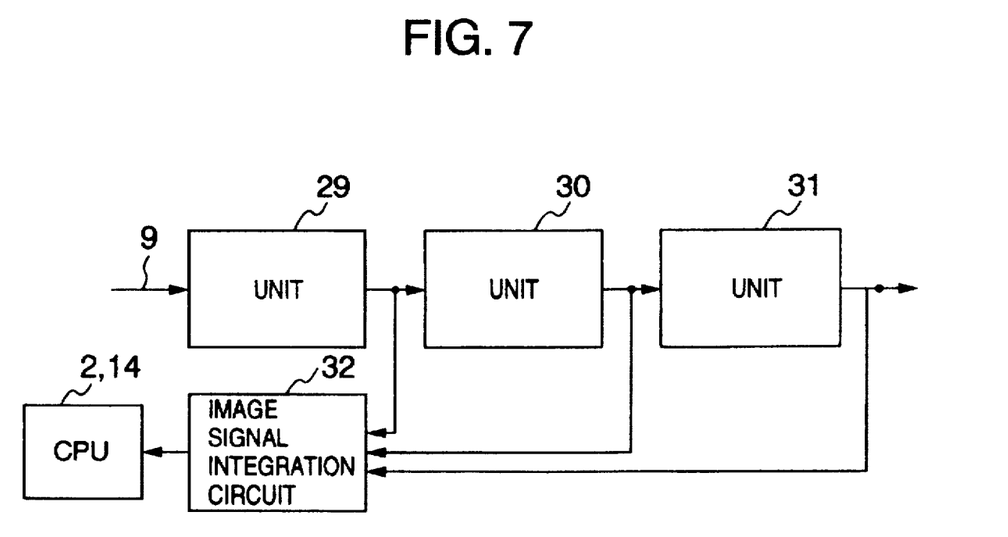
FIG. 7 is a block diagram showing the fault diagnosing construction of a digital multiplexer/demultiplexer according to the present invention.

FIG. 6 is a block diagram showing the construction of fault diagnosis of the image signal processing circuits 5 and 13 and FIG. 7 is a block diagram showing the construction of fault diagnosis of the digital multiplexer/demultiplexer circuits 6a and 6b.

In FIG. 6, units 25, 26 and 27 in the image signal processing circuits 5 and 13 include, for example, an amplification unit for amplifying the image signal to a suitable level, a gamma-correction unit, a profile correction unit, a matrix unit for generating a composite image signal, and so forth.

The test signal 9 inputted to the image signal processing circuits 5 and 13 is sequentially inputted to the unit 25, the unit 26 and the unit 27 inside the image signal processing circuits 5 and 13, and is processed and outputted, respectively. On the other hand, the output of each unit is inputted to a level detection circuit 28 for the purpose of fault diagnosis.

Here, each of the CPUs 2 and 14 reads the output level of each unit from the level detection circuit 28 and conducts fault diagnosis of each unit depending on whether or not each level is a normal level. If the result of fault diagnosis is abnormal, therefore, it is possible to identify the output of which unit is abnormal.

In FIG. 7, the units in the multiplexer/demultiplexer circuits 6a and 6b include, for example, an A/D conversion unit for converting the image signal and other signals to digital signals, a multiplexer unit for converting digitized parallel signals to serial signals and multiplexing them, a transmission unit for transmitting the serial signals to a transmission line, a reception unit for receiving the serial signals so transmitted, a demultiplexer unit for demultiplexing the serial signals to parallel signals, a D/A conversion unit for converting the digital signals so demultiplexed to analog signals, and so forth.

Referring to FIG. 7, further, the test signal 9 inputted to the digital multiplexer/demultiplexer circuits 6a and 6b is sequentially inputted to the unit 29, the unit 30 and the unit 31 inside the digital multiplexer/demultiplexer circuits 6a and 6b, is processed and outputted by and from each unit, and is inputted, on the other hand, to the image signal integration circuit 32 for fault diagnosis.

Figure 8:
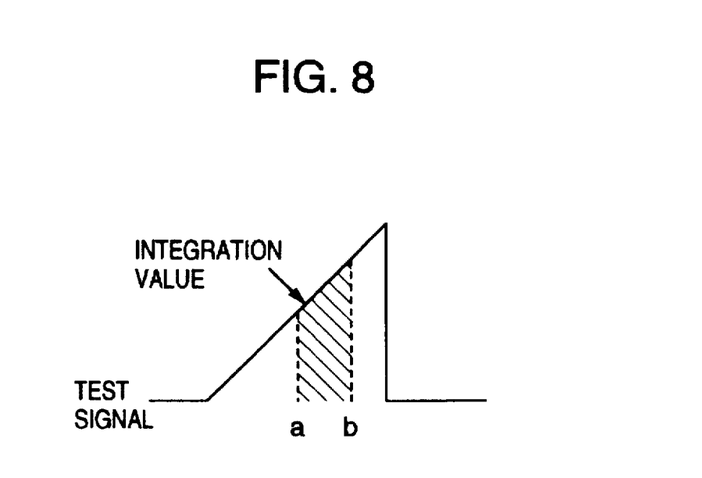
FIG. 8 is a conceptual diagram showing the concept of integrating of image signals in the present invention.

The image signal integration circuit 32 is the circuit which calculates the integration value of the digitized image signals for a predetermined period a to b as shown in FIG. 8.

Here, each of the CPUs 2 and 14 reads the integration value of the output of each unit from the image signal integration circuit 32, compares it with each expected value so set in advance to each CPU 2 and 14 as to correspond to each integration value, judges the image signal system as normal when each integration value coincides with the corresponding expected value and as abnormal when they do not. Accordingly, when the result of fault diagnosis is abnormal, it is possible to identify in which unit the output is abnormal.

When the result of fault diagnosis of the image signal system proves abnormal, the user of the apparatus is notified in which unit the output is abnormal, and when the result is normal, fault diagnosis is completed.

Incidentally, though the fault diagnosis process is divided into the three steps in the embodiment described above, the process can be divided into a greater number of process steps.

Further, fault diagnosis can be carried out sequentially from the system function having higher priority by applying priority to the divided fault diagnosis process steps on the basis of the basic functions of the system. The embodiment described above represents such an example.

Incidentally, known constituent members such as an imaging device for generating the image signal 8 are not directly relevant to the gist of the invention, and are therefore omitted from the drawings.

Figure 10:
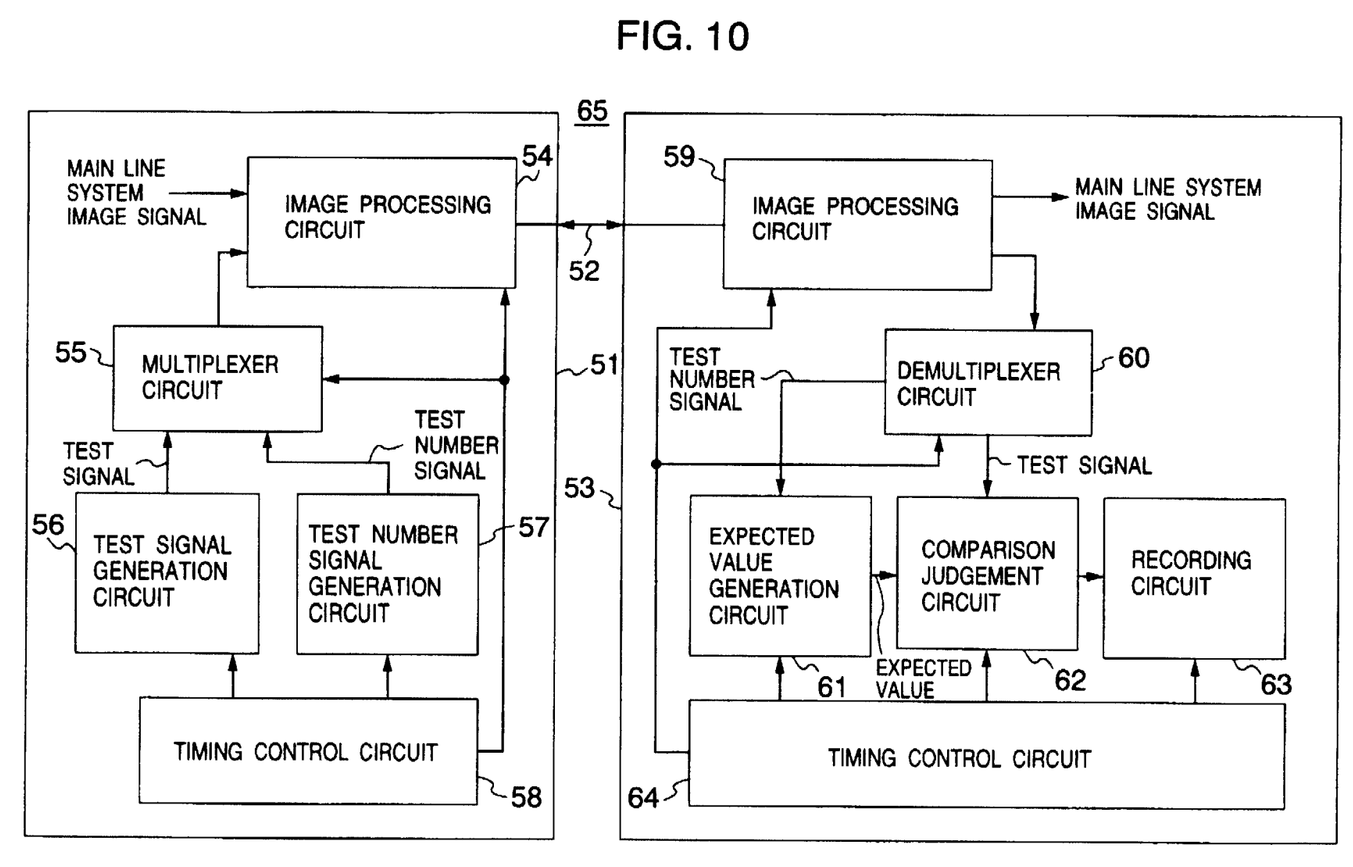
FIG. 10 is a schematic block diagram showing a video camera apparatus equipped with a fault diagnosing device according to another embodiment of the present invention.

FIG. 10 is a schematic block diagram showing the television camera apparatus equipped with a diagnosing device according to another embodiment of the present invention.

In FIG. 10, reference numeral 51 denotes a camera head, reference numeral 53 denotes a CCU, reference numeral 52 denotes a transmission line which connects the camera head 51 to the CCU 53, reference numeral 65 denotes a television camera apparatus comprising the camera head 51, the CCU 53 and the transmission line 52, reference numeral 54 denotes an image processing circuit of the camera head 51, reference numeral 58 denotes a timing control circuit for generating a timing signal which controls the signals in the camera head 51 and the timing of processings, reference numeral 56 denotes a test signal generation circuit for generating a plurality of kinds of test signals for diagnosis, which are sequentially changed over by the timing signal from the timing control circuit 58, reference numeral 57 denotes a test number signal generation circuit for generating a test number signal which is sequentially changed over by the timing signal from the timing control circuit 58 and identifies a plurality of kinds of test signals for diagnosis generated by the test signal generation circuit 56, and reference numeral 55 denotes a multiplexer circuit for multiplexing the test signal for diagnosis from the test signal generation circuit 56 and the test number signal from the test number signal generation circuit 57.

Reference numeral 59 denotes an image processing circuit provided in the CCU 53, reference numeral 64 denotes a timing control circuit for generating the timing signal which controls the signal in the CCU 53 and the timing of processing, reference numeral 60 denotes a demultiplexer circuit for demultiplexing the test signal for diagnosis from the test number signal from the signal inputted from the image processing circuit 59, reference numeral 61 denotes an expected value generation circuit for generating and outputting an expected value corresponding to the test signal for diagnosis identified from the test number signal inputted from the demultiplexer circuit 60, reference numeral 62 denotes a comparison judgement circuit for comparing and judging the test signal for diagnosis inputted from the demultiplexer circuit 60 and the expected value corresponding to the former from the expected value generation circuit 61, and reference numeral 63 denotes a recording circuit for recording the judgement result of diagnosis.

Figure 11:
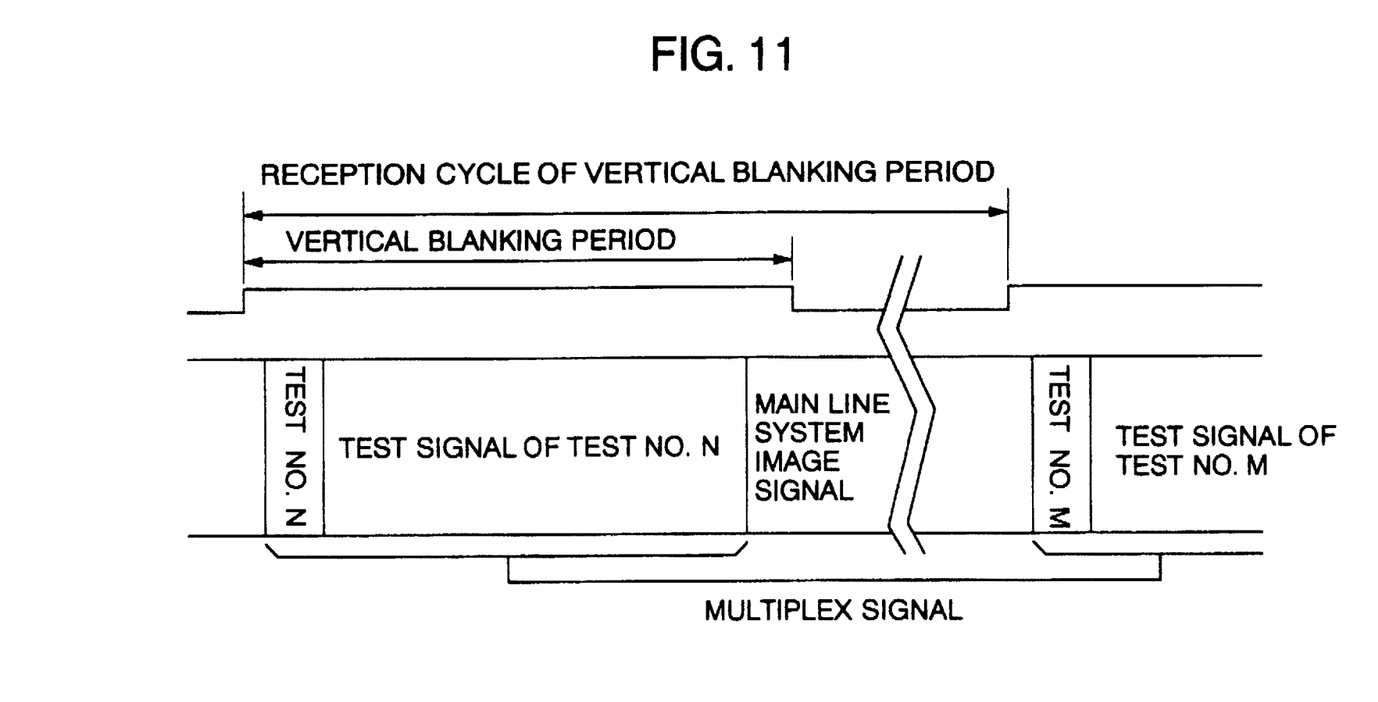
FIG. 11 is an explanatory view of a multiplex signal inserted into a main line system image signal used for the video camera apparatus equipped with the fault diagnosing device according to the present invention.

Next, the fault diagnosis operation in the television camera apparatus equipped with the diagnosing device according to the present invention in FIG. 10 will be explained. FIG. 11 shows the multiplex signal used in the embodiment shown in FIG. 10.

The operations such as normal image processing and image transmission are executed in the camera head 51 and in the CCU 53. The image signal of the main line system is inputted to the image processing circuit 54, is processed in a predetermined manner, is then transmitted through the transmission line 52, is inputted to the image processing circuit 59, and is outputted to other devices as the main line system image signal after predetermined processing is completed.

The fault diagnosis operation is carried out in the following way. First, a plurality of kinds of test signals for diagnosis, which are controlled by the timing signal from the timing control circuit 58 and are sequentially switched by the cycle of a vertical blanking signal, are repeatedly generated by the test signal generation circuit 56 and are outputted to the multiplexer circuit 55.

Similarly, the test number signals which are controlled by the timing signal from the timing control circuit 58, are sequentially switched by the cycle of the vertical blanking signal, correspond to a plurality of kinds of test signals for diagnosis generated by the test signal generation circuit 56 and identify these signals, are repeatedly generated by the test number signal generation circuit 57 and are outputted to the multiplexer circuit 55. When identification information is contained in advance in the plurality of kinds of test signals themselves for diagnosis generated by the test signal generation circuit 56, the test number signal generation circuit 57 and the multiplexer circuit 55 become unnecessary.

The multiplexer circuit 55 multiplexes the test signal for diagnosis from the test signal generation circuit 56 and the test number signal from the test number signal generation circuit 57, and outputs it as the multiplex signal to the image processing circuit 54.

The multiplex signal inputted to the image processing circuit 54 separately from the main line system image signal is controlled and processed on the basis of the timing signal separately inputted, and is inserted into a predetermined position within the vertical blanking period of the main line system image signal.

FIG. 11 shows the construction in which the multiplex signal comprising the test signal for diagnosis and the test number signal is inserted to the predetermined position within the vertical blanking period of the main line system image signal.

The multiplex signal inserted into the main line system image signal is subjected to predetermined processing with the main line image signal in the image processing circuit 54 and is outputted to the CCU 53 from the image processing circuit 54 through the transmission line 52.

The main line image signal into which the multiplex signal transmitted through the transmission line 52 is inserted, is inputted to the image processing circuit 59, is processed in a predetermined way by the image processing circuit 59 and is outputted to other devices as the main line system image signal (under the state where the multiplex signal is inserted or the under the state where it is removed). Further, it is separately inputted to the demultiplexer circuit 60 (under the state of the main line system image signal or the state where the multiplex signal exists alone).

The demultiplexer circuit 60 demultiplexes the test number signal and the test signal for diagnosis from the multiplex signal inserted into the inputted main line image signal, and outputs the test number signal to the expected value generation circuit 61 and the test signal for diagnosis to the comparison judgement circuit 62.

The expected value generation circuit 61 recognizes the test signal for diagnosis demultiplexed, by means of the test number signal inputted thereto, identifies and selects the corresponding expected value, and outputs the expected value so selected to the comparison judgement circuit 62.

The comparison judgement circuit 62 compares the test signal for diagnosis inputted from the demultiplexer circuit 60, processed by the image processing circuits 54 and 59 and outputted from them with the expected value corresponding to the test signal for diagnosis and inputted from the expected value generation circuit 61, judges the signal and-outputs the result of judgement to the recording circuit 63.

The recording circuit 63 records the judgement result and other data.

The timing control circuit 58 inside the camera head 51 and the timing control circuit 64 inside the CCU 53 are controlled in synchronism, and each circuit of these camera head 51 and CCU 53 is controlled by the respective timing control circuit.

As described above, the test number signal for identifying the test signal for diagnosis is sent with this test signal for diagnosis, which enables a plurality of kinds of test signals for diagnosis that are transmitted to be identified. Accordingly, serial switching of a plurality of test signals for diagnosis and serial switching of the expected values so generated as to correspond to the former can be conducted in the interlocking arrangement, and diagnosis of the image processing circuit inclusive of the transmission line for a plurality of kinds of test signals for diagnosis can be accomplished.

If the test number signal is recorded in the recording circuit in combination with the judgement result, the kind of the test signal for diagnosis as the object can be identified more easily when a diagnostic error occurs, for example, and counter-measures can be taken more appropriately.

Though the embodiment described above generates the test number signal for identifying the test signals for diagnosis, other identification information such as a sign may be used so long as they can identify the test signals for diagnosis, and the expected value itself corresponding to the test signal may be generated. In this case, the expected value generation circuit 61 becomes unnecessary.

When a plurality of transmission lines exist between the camera head and the CCU, it is possible to transmit the test number signal through a separate line without multiplexing it with the test signal for diagnosis.

Needless to say, a plurality of kinds of test signals for diagnosis can be prepared for the diagnosis of at least one of the data communication system, the image signal system, the sinc signal system and other systems by applying the embodiment shown in FIG. 10 to the embodiment shown in FIGS. 1 and 2, whenever necessary. In this connection, the test signal generation circuit is disposed on the camera head side and the expected value generation circuit, on the CCU side, in the embodiment shown in FIG. 10, respectively, but the present invention is not particularly limited to this construction. In other words, the test signal generation circuit may be disposed on the CCU side and the expected value generation circuit and the comparison judgement circuit, on the camera head side, in accordance with the content of diagnosis, and various other arrangements may be further employed. Incidentally, the multiplexer circuit 55 and the demultiplex circuit 60 may be accomplished by employing the bidirectional transmission technology such as one disclosed in U.S. patent application Ser. No. 08/361,724, for example.

Figure 12:
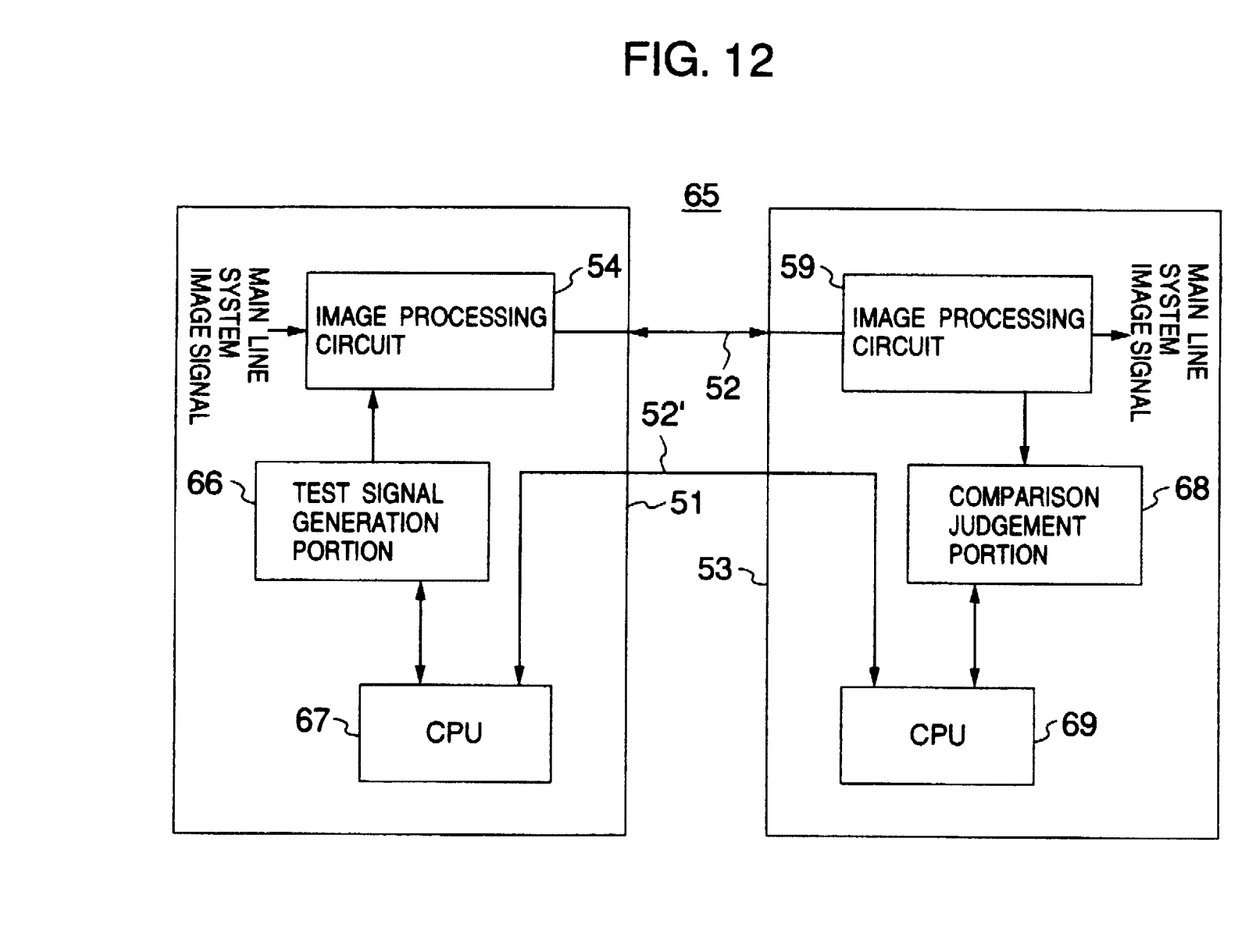
FIG. 12 is a schematic block diagram showing the video camera apparatus equipped with the fault diagnosing device according to still another embodiment of the present invention.

FIG. 12 is a schematic block diagram showing the television camera apparatus equipped with the diagnosing device according to still another embodiment of the present invention.

In the embodiment explained with reference to FIG. 10, generation of the test signal for diagnosis and the expected value, and their switching and judgement are all accomplished by the processing using the combination of hardwares, but in this embodiment shown in FIG. 12, a microcomputer (hereinafter referred to as the "CPU") is further added so as to combine the judgement function by the CPU.

Since the CPU is added, this CPU analyzes and judges the error content when such a diagnostic error occurs. Accordingly, a plurality of kinds of test signals for diagnosis, that are outputted sequentially and repeatedly in the fixed sequence of the hardwares, can be switched to the test signals for diagnosis that are necessary for identifying the cause of the error, and diagnosis can be executed by this output signal.

In FIG. 12, reference numeral 66 denotes a test signal generation portion comprising the same timing control circuit 58, the test signal generation circuit 56, the test number signal generation circuit 57 and the multiplexer circuit 55 as those shown in FIG. 10, reference numeral 67 denotes a CPU for controlling the camera head 51, reference numeral 68 denotes a comparison judgement portion comprising the same timing control circuit 64, the expected value generation circuit 61, the comparison judgement circuit 62, the demultiplexer circuit 60 and the recording circuit 63 as those shown in FIG. 10, and reference numeral 69 denotes a CPU for controlling the CCU 53. Since like reference numerals used in FIG. 10 are used also in FIG. 12 to identify like constituent members, explanation of such constituent members will be omitted.

Next, the fault diagnosis operation of the television camera apparatus equipped with the diagnosing device according to the present invention will be explained.

Incidentally, the camera head 51 and the CCU 53 are connected in the bidirectional transmission connection through the transmission line 52, and the CPU 67 inside the camera head 51 and the CPU 69 inside the CCU 53 mutually transmit the data through a CPU data line 52'.

First, the operation during the normal mode will be explained.

In the camera head 51, the main line system image signal is inputted to the image processing circuit 54, and the multiplex signal between the test signal for diagnosis generated by the test signal generation portion 66 and the test number signal is separately inputted to the image processing circuit 54.

The image processing circuit 54 inserts the multiplex signal between the test signal for diagnosis and the test number signal to the predetermined position of the vertical blanking period of the main line system image signal under the control of the CPU 67, executes predetermined image processing for the main line system image signal into which the multiplex signal is inserted, and outputs the image signal to the CCU 53 through the transmission line 52.

In the CCU 53, on the other hand, the main line system image signal which is inputted through the transmission line 52 and into which the multiplex signal is inserted is inputted to the image processing circuit 59. After predetermined image processing is executed in the image processing circuit 59, the multiplex signal is outputted as the main line system image signal to other devices and is also outputted separately to the comparison judgement portion 68.

The comparison judgement portion 68 demultiplexes the multiplex signal inputted thereto into the test signal for diagnosis and the test number signal, identifies and selects the expected value corresponding to this test signal for diagnosis by the test number signal so demultiplexed, compares and judges the selected expected value and the demultiplexed test signal for diagnosis with each other, and outputs and records the result of judgement.

The CPU 69 inside the CCU 53 periodically monitors the judgement result of the operation in the normal mode described above. The test number signal may be transmitted through the CPU data line 52' instead of multiplexing the test number signal with the main line system image signal, as set forth above.

Figure 13:
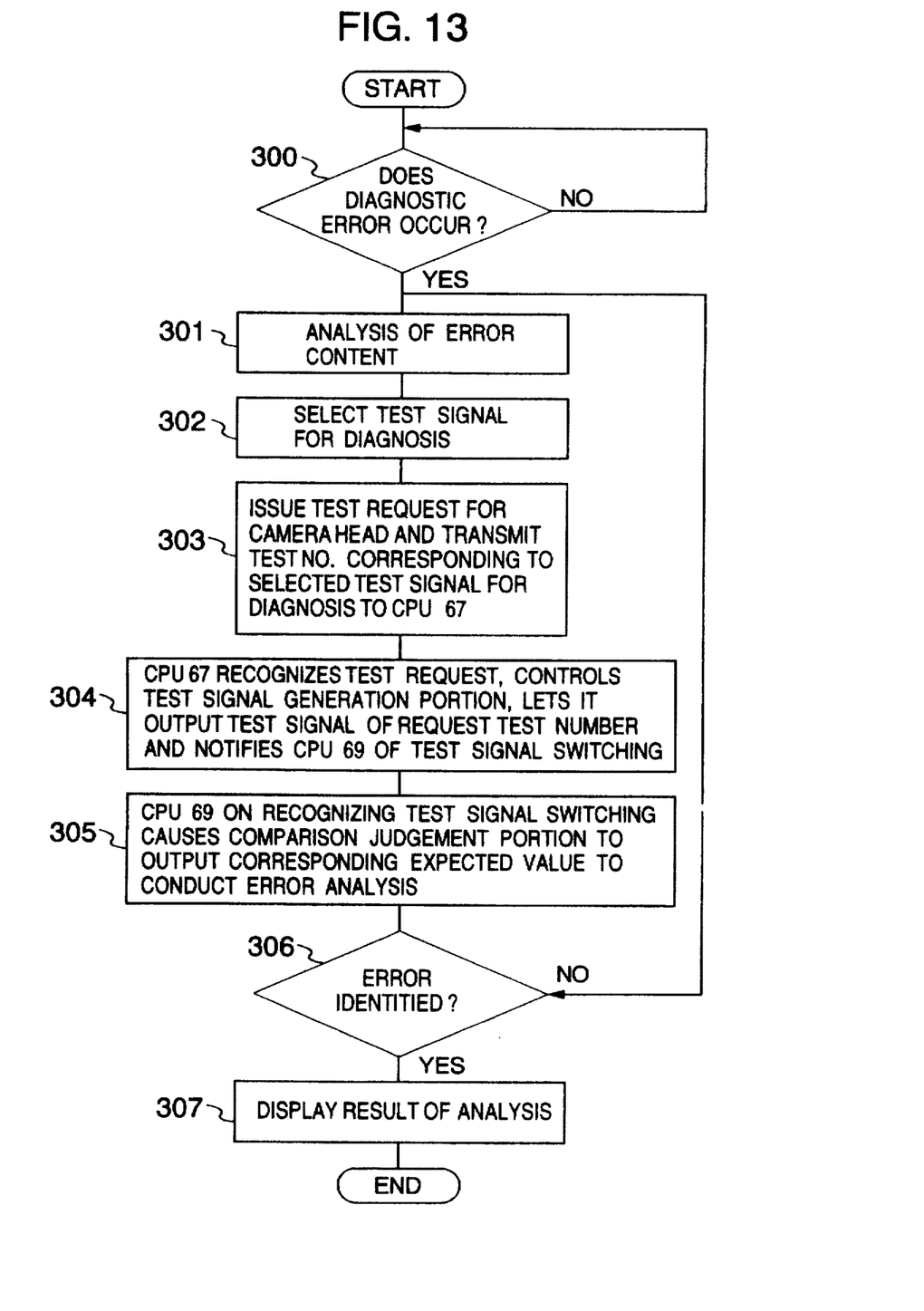
FIG. 13 is a flowchart of an error identifying process when a diagnostic error occurs in the embodiment shown in FIG. 12.

Next, the operation at the time of the occurrence of the diagnosis error will be explained with reference to FIG. 13 showing an error analysis flowchart.

When the diagnostic error occurs (step 300), the CPU 69 starts analyzing the content of the diagnosis error (step 301) and selects the test signal for diagnosis necessary for identifying the cause(s) of the diagnostic error on the basis of this analysis (step 302). The CPU 69 requests this test to the camera head 51 and transmits the test number signal corresponding to the selected test signal for diagnosis to the CPU 67 of the camera head 51 (step 303) through the CPU data line 52'.

Acknowledging the transmission of the test request, the CPU 67 controls the test signal generation portion 66, switches a plurality of kinds of test signals for diagnosis, which are generated sequentially and changeably, to the test signal for diagnosis corresponding to the requested test number transmitted from the CPU 69, outputs the test signal for diagnosis and notifies, through the CPU data line 52', that switching to the test signal corresponding to the CPU 69 has been made (step 304). The CPU 69, upon recognizing switching to the test signal in the camera head 51, controls the comparison judgement portion 68 so as to output the expected value corresponding to the switched test signal, to thereby execute the error analysis (step 305).

The CPU 67 and the CPU 69 repeat a series of processings until the cause of the diagnostic error can be identified (step 306), and display the result of analysis on display means, not shown in the drawing (step 307).

Selection of the test signal for diagnosis that is necessary for identifying the diagnostic error from the generation of the diagnosis error, the result of analysis, etc. can be recorded in the comparison judgement portion 68.

As described above, according to one of the features of the present invention, fault diagnosis in the television camera apparatus is divided into a plurality of process steps, and fault diagnosis of the next steps is not executed until the result of fault diagnosis in each fault diagnosis step is judged as normal. Therefore, even when faults occur at a plurality of positions, the causes for the faults can be sequentially analyzed from the fundamental fault, and the rate of successful fault analysis of the television camera apparatus can be improved.

The fault of the fundamental function can be detected more quickly by putting priority to the fault diagnosing process steps so divided.

According to another feature of the present invention, switch of a plurality of kinds of test signals for diagnosis and switch of the expected values corresponding to the former can be interlocked rationally. Accordingly, a fault diagnosis method of a television camera apparatus which accomplishes fault diagnosis by a plurality of kinds of test signals and can improve diagnosis efficiency can be obtained.

According to still another feature of the present invention, analysis of the diagnostic error content is started when the diagnosis error occurs, the test signal for diagnosis necessary for identifying the cause of the diagnosis error is selected on the basis of this analysis, and diagnosis is made by using a specific test signal for diagnosis. Therefore, the cause of the diagnosis error can be made more easily.

What is claimed is:

1. A fault diagnosis method of a television camera apparatus comprising the steps of:

dividing in advance fault diagnosis of said television camera apparatus into a plurality of fault diagnosing processes; and executing one by one a plurality of said fault diagnosing processes;

wherein, when the result of diagnosis in certain one fault diagnosing process is diagnosed as fault, fault diagnosis of subsequent fault diagnosing processes is not executed until the result of diagnosis in said certain one fault diagnosing process is diagnosed as normal;

wherein said television camera apparatus includes a camera head and a camera control unit connected with each other by a transmission line, and wherein at least one of a plurality of said fault diagnosing processes is executed by a method including the following steps:

a first step of generating a test signal for diagnosing said television camera apparatus in one sub-apparatus of said camera head and said camera control unit and transmitting said test signal to the other sub-apparatus of said camera head and said camera control unit; and a second step of receiving said test signal for diagnosis by the other sub-apparatus, comparing said test signal so received with an expected value corresponding to said test signal and executing fault diagnosis of said television camera apparatus; and wherein a plurality of kinds of sets of said test signals for diagnosis and said expected values corresponding to said test signals are prepared in advance, and when each of a plurality of kinds of said test signals for diagnosis is transmitted by said first step, information on said test signal for diagnosis to be transmitted is also transmitted, and comparison between said test signal for diagnosis so received and said expected value corresponding to the test signal is effected by said second step by utilizing said information so received, and a plurality of kinds of fault diagnoses are thus executed.

2. A fault diagnosis method according to claim 1, wherein said information on said test signal for diagnosis is identification information for identifying said test signal for diagnosis, said test signal for diagnosis that is received is identified by said identification information, an expected value corresponding to said test signal for diagnosis is generated, and said test signal for diagnosis so identified and said corresponding expected value so generated are compared with each other.

3. A fault diagnosis method according to claim 1, wherein said information on said test signal for diagnosis is an expected value corresponding to said test signal for diagnosis, said test signal for diagnosis so received and said expected value corresponding to said received test signal for diagnosis are compared with each other, and various fault diagnoses of said television camera apparatus are executed.

4. A fault diagnosis method according to claim 1, wherein, when any diagnostic error is detected, a microprocessor for analyzing a fault diagnosis disposed inside each of said camera head and said camera control unit selects a test signal for diagnosis which is necessary for identifying the cause of said diagnostic error, a test request for fault diagnosis on the basis of said test signal for diagnosis so selected is sent to one of said sub-apparatuses, and the analysis of said diagnostic error is thereafter executed by using said test signal for diagnosis that corresponds to the identification of the cause of said diagnostic error, upon receiving said test request.

5. A fault diagnosis method according to claim 2, wherein, when any diagnostic error is detected, a microprocessor for analyzing a fault diagnosis disposed inside each of said camera head and said camera control unit selects a test signal for diagnosis which is necessary for identifying the cause of said diagnostic error, a test request for fault diagnosis on the basis of said test signal for diagnosis so selected is sent to one of said sub-apparatuses, and the analysis of said diagnostic error is thereafter executed by using said test signal for diagnosis that corresponds to the identification of the cause of said diagnostic error, upon receiving said test request.

6. A fault diagnosis method according to claim 3, wherein, when any diagnostic error is detected, a microprocessor for analyzing a fault diagnosis disposed inside each of said camera head and said camera control unit selects a test signal for diagnosis which is necessary for identifying the cause of said diagnostic error, a test request for fault diagnosis on the basis of said test signal for diagnosis so selected is sent to one of said sub-apparatuses, and the analysis of said diagnostic error is thereafter executed by using said test signal for diagnosis that corresponds to the identification of the cause of said diagnostic error, upon receiving said test request.

7. A fault diagnosis method according to claim 1, wherein said test signal for diagnosis is multiplexed with an image signal transmitted between one and the other of said sub-apparatuses and is transmitted.

8. A fault diagnosis method according to claim 1, wherein said test signal for diagnosis is transmitted through another transmission line disposed separately from said transmission line.

9. A fault diagnosis method of a television camera apparatus including sub-apparatuses which are connected with each other by a transmission line, one of which is a camera head and the other of which is a camera control unit, said method comprising:
- a first step of generating a test signal for diagnosis for said television camera apparatus in sub-apparatus of said camera head and said camera control unit, and transmitting said test signal to the other sub-apparatus of said camera head and said camera control unit; and
- a second step of receiving said test signal for diagnosis by the other sub-apparatus, comparing said test signal for diagnosis so received with an expected value corresponding to said test signal for diagnosis, and executing fault diagnosis of said television camera apparatus;
- wherein a plurality of kinds of said test signals for diagnosis are prepared in advance, and information associated with said test signal for diagnosis to be transmitted is transmitted with said test signal for diagnosis when the test signal is transmitted in said first step; and
- wherein said test signal for diagnosis so received and said expected value corresponding to said test signal are compared in said second step by utilizing said information so received, and a plurality of kinds of fault diagnoses are executed for said television camera apparatus.

10. A fault diagnosis method according to claim 9, wherein said information associated with said test signals for diagnosis is identification information for identifying said test signals for diagnosis, said received test signals for diagnosis are identified on the basis of said identification information so received, said expected value corresponding to each of said test signals for diagnosis is generated and said test signal for diagnosis that is identified and said expected value corresponding to said test signal for diagnosis are compared.

11. A fault diagnosis method according to claim 9, wherein said information associated with said test signals for diagnosis is an expected value corresponding to each of said test signals for diagnosis, each of said received test signals for diagnosis and said expected value corresponding to said received test signal for diagnosis are compared, and various fault diagnoses of said television camera apparatus are executed.

12. A fault diagnosis method according to claim 9, wherein, when any diagnostic error is detected, a microprocessor for analyzing a fault diagnosis disposed inside each of said camera head and said camera control unit selects a test signal for diagnosis which is necessary for identifying the cause of said diagnostic error, a test request for fault diagnosis on the basis of said test signal for diagnosis so selected is sent to one of said sub-apparatuses, and the analysis of said diagnostic error is thereafter executed by using said test signal for diagnosis that corresponds to the identification of the cause of said diagnostic error, upon receiving said test request.

13. A fault diagnosis method according to claim 10, wherein, when any diagnostic error is detected, a microprocessor for analyzing a fault diagnosis disposed inside each of said camera head and said camera control unit selects a test signal for diagnosis which is necessary for identifying the cause of said diagnostic error, a test request for fault diagnosis on the basis of said test signal for diagnosis so selected is sent to one of said sub-apparatuses, and the analysis of said diagnostic error is thereafter executed by using said test signal for diagnosis that corresponds to the identification of the cause of said diagnostic error, upon receiving said test request.

14. A fault diagnosis method according to claim 11, wherein, when any diagnostic error is detected, a microprocessor for analyzing a fault diagnosis disposed inside each of said camera head and said camera control unit selects a test signal for diagnosis which is necessary for identifying the cause of said diagnostic error, a test request for fault diagnosis on the basis of said test signal for diagnosis so selected is sent to one of said sub-apparatuses, and the analysis of said diagnostic error is thereafter executed by using said test signal for diagnosis that corresponds to the identification of the cause of said diagnostic error, upon receiving said test request.

15. A fault diagnosis method according to claim 9, wherein said test signal for diagnosis is multiplexed with an image signal transmitted between one and the other of said sub-apparatuses and is transmitted.

16. A fault diagnosis method according to claim 9, wherein said test signal for diagnosis is transmitted by another transmission line disposed separately from said transmission line.

* * * * *